(12) United States Patent
Kanamitsu et al.

(10) Patent No.: US 8,920,917 B2
(45) Date of Patent: Dec. 30, 2014

(54) POLYPROPYLENE RESIN COMPOSITION, EXPANSION-MOLDED ARTICLE USING THE RESIN COMPOSITION, AND PROCESS FOR PRODUCTION OF THE EXPANSION-MOLDED ARTICLE

(75) Inventors: Yasuji Kanamitsu, Ikoma (JP); Kiminori Sato, Ikoma (JP); Satoru Tominaga, Ikoma (JP); Atsushi Wada, Mishima (JP); Hiroyuki Hirano, Mishima (JP)

(73) Assignee: Sekisui Techno Molding Co., Ltd., Nara (JP)

( * ) Notice: Subject to any disclaimer, the term of this patent is extended or adjusted under 35 U.S.C. 154(b) by 914 days.

(21) Appl. No.: 12/451,096

(22) PCT Filed: Sep. 28, 2007

(86) PCT No.: PCT/JP2007/069065
§ 371 (c)(1),
(2), (4) Date: Oct. 26, 2009

(87) PCT Pub. No.: WO2008/136143
PCT Pub. Date: Nov. 13, 2008

(65) Prior Publication Data
US 2010/0080979 A1  Apr. 1, 2010

(30) Foreign Application Priority Data

Apr. 24, 2007 (JP) .................................. 2007-113790

(51) Int. Cl.
| | | |
|---|---|---|
| *C08L 91/06* | (2006.01) | |
| *C08L 23/10* | (2006.01) | |
| *B32B 5/18* | (2006.01) | |
| *B32B 27/32* | (2006.01) | |
| *C08J 9/06* | (2006.01) | |
| *B29C 44/04* | (2006.01) | |
| *C08J 9/00* | (2006.01) | |
| *B29K 23/00* | (2006.01) | |
| *B29K 105/04* | (2006.01) | |
| *B29L 31/30* | (2006.01) | |

(52) U.S. Cl.
CPC .......... *B29C 44/0415* (2013.01); *C08J 9/0061* (2013.01); *C08J 9/06* (2013.01); *B29K 2023/12* (2013.01); *B29K 2105/04* (2013.01); *B29L 2031/3014* (2013.01); *C08J 2323/12* (2013.01); *C08J 2491/00* (2013.01)
USPC .......................... 428/319.9; 264/54; 524/487

(58) Field of Classification Search
USPC .......................... 428/319.9; 264/54; 524/487
See application file for complete search history.

(56) References Cited

U.S. PATENT DOCUMENTS

2001/0036971 A1* 11/2001 Usui et al. ........................ 521/50
2005/0056957 A1* 3/2005 Hira et al. ..................... 264/46.8
(Continued)

FOREIGN PATENT DOCUMENTS

| EP | 0 799 853 | 10/1997 |
|---|---|---|
| EP | 0 925 895 | 6/1999 |

(Continued)

OTHER PUBLICATIONS

Human translation of JP 1991-010411 (1991).*
(Continued)

*Primary Examiner* — Samir Shah
(74) *Attorney, Agent, or Firm* — Wenderoth, Lind & Ponack, L.L.P.

(57) ABSTRACT

A polypropylene resin composition which can produce an expansion-molded article showing excellent low-temperature impact properties even when expanded at an increased expansion rate; an expansion-molded article using the polypropylene resin composition, which has excellent low-temperature impact properties, is light in weight, and has good appearance; and a process for producing the expansion-molded article. Using a polypropylene resin composition comprising 100 weight of a polypropylene resin and 1 to 4 parts by weight of a polyethylene wax having a viscosity average molecular weight of 2400 to 3400, an expansion-molded article which is expanded at an expansion rate of 1.5 to 3 times is produced by injection expansion molding by means of a gas counter pressure technique.

10 Claims, 8 Drawing Sheets

(56) References Cited

U.S. PATENT DOCUMENTS

| | | | |
|---|---|---|---|
| 2005/0179158 A1* | 8/2005 | Harada et al. | 264/51 |
| 2007/0100055 A1* | 5/2007 | Uosaki et al. | 524/487 |
| 2009/0140447 A1 | 6/2009 | Kawamura et al. | |

FOREIGN PATENT DOCUMENTS

| | | | |
|---|---|---|---|
| JP | 3-86737 | | 4/1991 |
| JP | 1991010411 | * | 4/1991 |
| JP | 11-179752 | | 7/1999 |
| JP | 2002-206034 | | 7/2002 |
| JP | 2005-220229 | | 8/2005 |
| JP | 2005-220303 | | 8/2005 |
| WO | 01/64777 | | 9/2001 |
| WO | 2006/051794 | | 5/2006 |

OTHER PUBLICATIONS http://plastics.ides.com/generics/39/polypropylene-pp (2013).*
International Search Report issued Oct. 30, 2007 in International (PCT) Application No. PCT/JP2007/069065.

* cited by examiner

POLYPROPYLENE RESIN COMPOSITION, EXPANSION-MOLDED ARTICLE USING THE RESIN COMPOSITION, AND PROCESS FOR PRODUCTION OF THE EXPANSION-MOLDED ARTICLE

This application is a U.S. national stage of International Application No. PCT/JP2007/069065 filed Sep. 28, 2007.

TECHNICAL FIELD

The present invention relates to a polypropylene resin composition, an expansion-molded article using the resin composition, and a process for producing the expansion-molded article.

BACKGROUND ART

An expansion-molded article using a polypropylene resin composition is used as an interior trim material such as an automotive door trim (see Patent Literature 1).

In addition, an expansion-molded article described above is obtained by: filling a polypropylene resin composition including a chemical expanding agent in a mold which is in a closed state; then cooling the resin composition with an uncooled portion (expandable part) being left in a central portion in the thickness direction; pulling back the core of a movable mold to cause expansion of the uncooled portion (expandable part); and then cooling and solidifying the resin composition.

Figure 11:
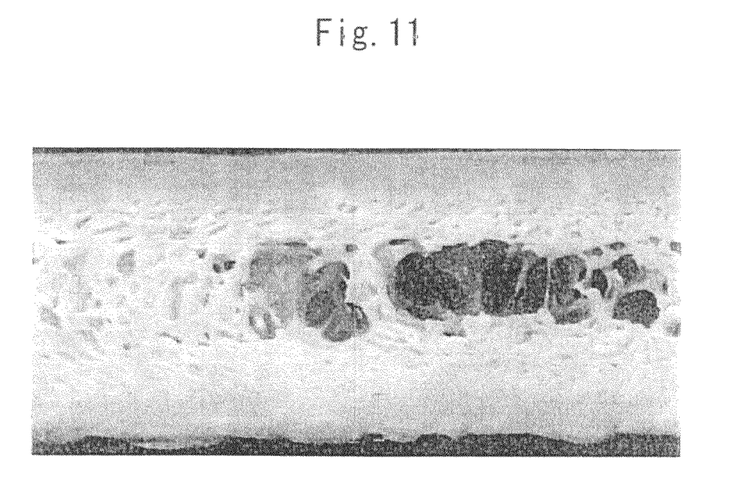
FIG. 11 A copy of a picture of a cross-sectional shape of an expansion-molded article using a conventional polypropylene resin composition.
Figure 12:
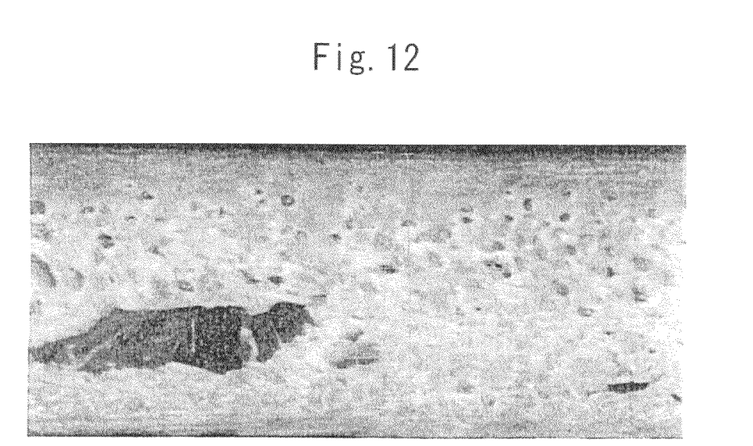
FIG. 12 A copy of a picture of a cross-sectional shape of an expansion-molded article using a conventional polypropylene resin composition.

However, when a conventional polypropylene resin composition is used and an expansion rate is more than two times, cells in an expansion layer existing inside are destroyed, resins at a cell wall are attached to each other and become stringy, a resin becomes stringy, and a void like a cave is generated (see FIGS. 11 and 12), causing: (1) deterioration in low-temperature impact strength; (2) deterioration in surface smoothness of the skin layer; (3) deformation after molding; and the like. Moreover, when content of an expanding agent is increased in order to enhance an expansion rate, a swirl mark is generated at the surface of a molded article, causing poor appearance.

Therefore, only approximately 1.6 times can be obtained as an injection expansion-molded article, which has excellent appearance quality and sufficient low-temperature impact strength, and sufficient weight saving has not been realized yet.

Patent Literature 1: Japanese Published Unexamined Patent Application No. H11-179752

DISCLOSURE OF THE INVENTION

Problems to be Resolved by the Invention

The present invention has been made in view of such a situation, and it is an object thereof to provide: a polypropylene resin composition which can produce an expansion-molded article showing excellent low-temperature impact properties even when expanded at an increased expansion rate; an expansion-molded article using the polypropylene resin composition, which has excellent low-temperature impact properties, is light in weight, and has good appearance; and a process for producing the expansion-molded article.

Means of Solving the Problems

To achieve the object described above, a polypropylene resin composition for injection expansion molding according to the present invention (which will be hereinafter referred to simply as "a polypropylene resin composition of the present invention") is characterized by including a polypropylene resin, which is selected from the group consisting of a homo polypropylene, a random polypropylene and a block polypropylene, a polyethylene wax having a viscosity average molecular weight of 2400 to 3400 and a chemical expanding agent as major components, wherein the compounding ratio of the polyethylene wax is 1 to 4 parts by weight relative to 100 parts by weight of the polypropylene resin.

A polypropylene resin to be used for a polypropylene resin composition of the present invention may be a homo polypropylene, a random polypropylene, a block polypropylene or the like, although a random polypropylene or a block polypropylene is especially preferable.

Moreover, a polyethylene wax needs to have a viscosity average molecular weight within a range from 2400 to 3400 and a polyethylene wax having a viscosity average molecular weight around 2900 is especially preferable, and a greater effect may be obtained by narrower molecular-weight distribution. This is because the surface hardness of an expansion-molded article tends to deteriorate causing deterioration in scuff resistance, softening of the entire expansion-molded article and deterioration in rigidity when the viscosity average molecular weight is under 2400, and a molded article becomes hard causing deterioration in impact resistance when the viscosity average molecular weight is over 3400.

Moreover, the weight part of a polyethylene wax is limited to 1 to 4 parts by weight relative to 100 weight of a polypropylene resin, because the additional effect is small when the weight part is under 1 part by weight, and a large expansion cell or a large cavity made by united burst foam causes a strength problem when the weight part is over 4 parts by weight.

A polypropylene resin composition of the present invention can be obtained by, for example, mixing pellets of a polypropylene resin and pellets of a polyethylene wax in a pellet state and then melting and kneading the mixture.

An example of an expanding agent is, for example, a chemical expanding agent such as sodium hydrogen carbonate or azodicarbonamide.

The weight part of an expanding agent is preferably adjusted so that a theoretical expansion rate becomes 1.05 to 2 times a target expansion rate of a molded article.

For example, when the target expansion rate of a molded article is two times, the weight part may be adjusted so that the theoretical expansion rate becomes 2.1 to 4 times.

Furthermore, a polypropylene resin composition of the present invention may include heretofore known various bulking agents, pigments, antistatic agents and the like in addition to the polypropylene resin, the polyethylene wax and the expanding agent described above, without obstructing the object of the present invention.

On the other hand, an expansion-molded article according to the present invention is characterized by being obtained by expansion molding of the polypropylene resin composition of the present invention described above.

Regarding an expansion-molded article of the present invention, an expansion rate of the molded article is preferably 1.5 to 3 times (more preferably, 1.8 to 3 times).

That is, the effect of weight saving becomes small when the expansion rate is under 1.5 times, and deterioration in low-temperature impact strength, deterioration in surface smoothness of the skin layer, flaws in appearance and the like may possibly arise when the expansion rate is over 3 times.

It is to be noted that an expansion rate in the present invention means the total thickness of a molded article after core pulling back relative to the thickness of a cavity.

Furthermore, regarding an expansion-molded article of the present invention, the total capacity occupied by a cavity part of expansion cells, which respectively have an opening area of the maximum cross section of not more than 0.1 mm$^2$, included in unit volume of a part other than the skin layer of a molded article is preferably not less than 60%, that is, the total capacity occupied by a cavity part of expansion cells, which respectively have an opening area of the maximum cross section of not more than 0.1 mm$^2$, is preferably not less than 0.6 mm$^3$ when unit volume is 1 mm$^3$.

That is, larger effect can be realized in improvement in low-temperature impact strength, improvement in surface smoothness of the skin layer and improvement in appearance as more expansion cells having small unit capacity exist, and the above quality may possibly deteriorate as fewer exist.

It is to be noted that the total volume occupied by a cavity part in unit volume can be measured by measuring, for example, the specific gravity or the density of an unexpanded polypropylene resin composition and an expanded polypropylene resin composition. Incidentally, assuming that the density of an unexpanded polypropylene resin composition is 0.9 and the density of an expanded polypropylene resin composition is 0.36, the density is 40% of an unexpanded polypropylene resin composition and the ratio of the total volume of expansion cells is 60% of the entire expanded polypropylene resin composition.

An example of a method for estimation of the opening area described above is, for example, a method of: cutting an expanded site in the thickness direction; measuring the dimension of each portion of the cut surface using a commercial digital microscope or a laser microscope; and performing integration.

The opening area of the maximum cross section can be obtained by, for example, cutting a molded article into small pieces and measuring the area of an opening of each cut surface as described above, although the present inventors have found it possible to judge that the area of the maximum opening of all expansion cells in a part within a distance of 25 mm from a measured cut surface in the vertical direction is not more than 0.1 mm$^2$ as long as the opening area of the maximum cross section existing in a part of a width of not less than 50 mm of a cut surface of a molded article is not more than 0.1 mm$^2$.

Accordingly, when a molded article is not cut into small pieces but cut at 50 mm intervals and the opening area of the maximum cross section existing in a part of a width of not less than 50 mm of each cut surface is not more than 0.1 mm$^2$, it seems possible to judge that the opening area of the maximum cross section of expansion cells in the entire molded article is not more than 0.1 mm$^2$.

Moreover, regarding an expansion-molded article of the present invention, the thickness of the skin layer of a molded article is preferably 0.2 to 0.4 mm.

That is, when the thickness of the skin layer is smaller than 0.2 mm, impact strength and flexural modulus required of a molded article become insufficient making it difficult to achieve the original function, and cooling shrinkage stress may possibly cause deterioration in surface smoothness of the skin layer. Moreover, when the thickness of the skin layer is over 0.4 mm, the thickness ratio of an expansion layer becomes small, expansion is disrupted and a target expansion rate is not achieved, and satisfactory weight saving by expansion may possibly be not achieved.

The application of an expansion-molded article according to the present invention is a molded article for which weight saving, high appearance quality, flexural modulus and impact strength are required, for example, an interior trim material in a car, an interior trim material in a building (e.g., a wall material, a ceiling material or the like), a container for storing or transporting food.

A process for producing an expansion-molded article according to the present invention preferably comprises: a step of filling a polypropylene resin composition of the present invention in a mold by injection with the inside of a cavity being pressurized to (atmospheric pressure+0.05 MPa) to (atmospheric pressure+1 MPa) or, more preferably, (atmospheric pressure+0.05 MPa) to (atmospheric pressure+0.8 MPa); a step of releasing the pressurized state in the mold; and a step of pulling back the core of a movable mold.

That is, when a polypropylene resin composition of the present invention is filled in a cavity by injection with the pressure of the inside of the cavity being adjusted to under (atmospheric pressure+0.05 MPa), a running pattern made by burst foam, which is referred to as a swirl mark or silver, may possibly arise on the surface of an expansion-molded article to be obtained, causing poor appearance.

When the pressure of the inside of the cavity at the time of injection of resin is over (atmospheric pressure+1 MPa), a considerable accuracy in mold processing for a movable mold is necessary in order to ensure airtightness, and scoring or seizing between metals arises when the accuracy is insufficient. Therefore, it becomes necessary to improve the rigidity of a mold and to improve the strength and the durability of a movable mold, and a sealing material or a sealing method having a high accuracy becomes necessary, which tends to cause a cost increase in mold production.

Furthermore, the timing of starting pulling back the core of a movable mold is preferably 0.2 to 2 seconds after completion of injection filling of a polypropylene resin composition of the present invention into a mold.

That is, formation of the skin layer becomes insufficient, a necessary thickness of the skin layer cannot be ensured and a strength problem arises in a molded article to be obtained when the timing of starting pulling back the core is too early, and the thickness of the skin layer becomes too large, a problem described above arises and a problem may possibly arise in terms of weight saving when the timing of starting pulling back the core is too late.

Moreover, the position where the pressure of the inside of a cavity is released is not especially limited as long as exhaust can be achieved smoothly and poor appearance of a molded article is not caused, although it is preferable to select at least one site selected from: a mold site facing a part adjacent to a weld at the rear face side of a molded article; a flow end of a polypropylene resin composition; a mold parting portion; and a mold site facing a molding flash portion provided adjacent to the parting.

The injection filling speed of a polypropylene resin composition of the present invention into a cavity is preferably a speed which makes it possible to complete injection filling within 1.5 seconds.

That is, when too much time is spent for injection filling, locational dispersion arises in growth of the thickness of the skin layer in contact with a mold. In concrete terms, the thickness of the skin layer near the gate becomes large since duration of contact with a mold becomes long, and the thickness of the skin layer far from the gate becomes small since duration of contact with a mold becomes short. As a result, the thickness of an expansion layer also undergoes significant fluctuation, causing a difference in the physical properties and the appearance of an expansion-molded article.

A mold to be used in the present invention preferably has high airtightness of the inside of the cavity, and it is preferable to apply a sealing using an O-ring or packing or fitting sealing using a concavity and convexity for a working face between a movable mold and a stationary mold and to apply a sealing using an O-ring or packing for a stationary portion and accurate fitting for slide surface between metals such as the slide core and an ejector pin.

Regarding an injection nozzle of an injection device, it is preferable to improve the airtightness by applying a sealing using an O-ring or packing or fitting sealing using a concavity and convexity for nozzle touch surface and to improve the airtightness from the injection screw side, using a shut-off valve or the like.

Furthermore, the mold described above preferably comprises a slide mold, which can slide in a mold in a mold closed state, is kept in a position behind the mold surface of the cavity before completion of closing of a mold and slides to make an end face thereof come to the mold surface of the cavity after completion of closing of a mold and before filling of resin so as to pressurize the inside of the cavity to a predetermined pressure of (atmospheric pressure+0.05) MPa to (atmospheric pressure+1.0) MPa, in at least one of a movable mold and a stationary mold.

That is, with such a structure, a gas generator such as a gas bomb or a compressed air supply or the like becomes unnecessary and the running cost can also be reduced and, moreover, the structure of a mold relating to a sealing mechanism is simplified and the cost for the mold can be reduced.

Moreover, adjustment of the pressure of the inside of the cavity can be achieved by adjusting the movement stroke of a slide mold or movement distance of a movable mold at the time of closing of a mold. That is, when the movement distance of the slide mold or the movement distance of a movable mold at the time of closing of a mold is lengthened, the pressure of the inside of the cavity can be increased.

In addition, the pressure of the inside of the cavity can be controlled easily since what is needed is only the movement of the slide mold.

As described above, since a polypropylene resin composition of the present invention includes a polypropylene resin, which is selected from the group consisting of a homo polypropylene, a random polypropylene and a block polypropylene, a polyethylene wax having a viscosity average molecular weight of 2400 to 3400 and a chemical expanding agent as major components and the compounding ratio of the polyethylene wax is 1 to 4 parts by weight relative to 100 parts by weight of the polypropylene resin, the polyethylene wax fills a void part of a polypropylene resin in a melted state, the polypropylene resin apparently reaches a higher molecular weight in a physically united form, "tear off" of the polypropylene resin at the time of opening of a mold in a core pulling back step can be prevented, and burst of an expansion cell can be prevented, and generation of a large cavity at the inside can be prevented. That is, it is possible to improve the flexural modulus and the low-temperature impact strength of a molded article to be obtained.

In addition, a polypropylene resin composition of the present invention makes it possible to obtain a product having an expansion rate not less than two times, although a product having an expansion rate approximately two times has not been obtained since inner cells are damaged and cells closed with a continuous face cannot be obtained, which results in extremely low physical properties.

That is, when the expansion rate becomes not less than two times, the weight of the product can be reduced. For example, when applied to an interior automotive trim material, the weight of the interior trim material, which has been approximately 10 kg, can be reduced to not more than approximately 50% or less and, as a result, weight saving of the entire car is achieved, which also improves the fuel efficiency.

On the other hand, an expansion-molded article according to the present invention, which is obtained by expansion molding of a polypropylene resin composition of the present invention and has an expansion rate of 1.5 to 3 times, is light in weight and has excellent flexural strength and excellent low-temperature impact strength.

Moreover, when the total volume occupied by a cavity part of expansion cells, which respectively have an opening area of the maximum cross section of not more than 0.1 mm$^2$, included in unit volume of a part other than the skin layer of a molded article is made not less than 60%, a molded article, which has flexural strength and low-temperature impact strength high enough for an automotive interior art and has weight saved in comparison with a conventional one, can be obtained.

BEST MODE FOR CARRYING OUT THE INVENTION

The following description will explain the present invention in detail with reference to the drawings illustrating an embodiment thereof.

Figure 1:
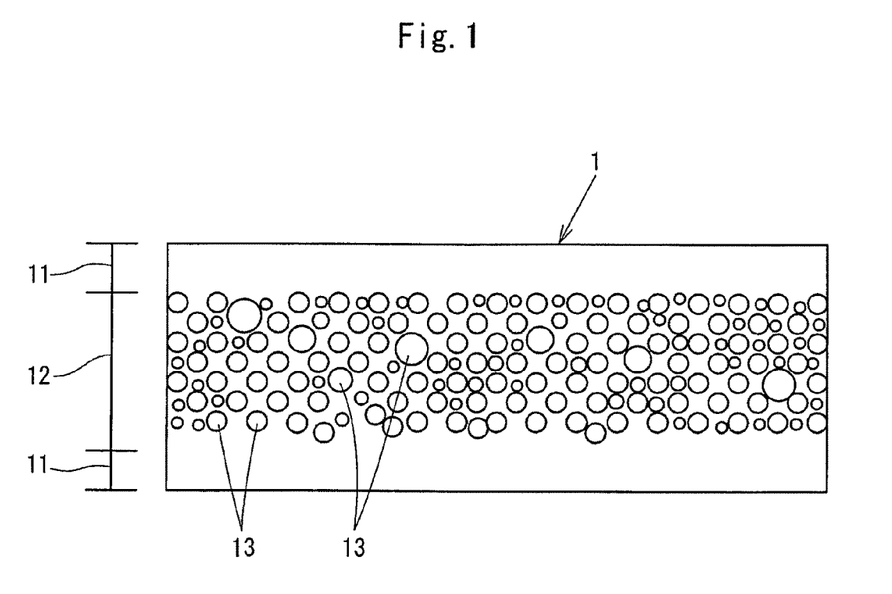
FIG. 1 A sectional view for illustrating one embodiment of an expansion-molded article according to the present invention.

FIG. 1 illustrates one embodiment of an expansion-molded article according to the present invention in a sectional view.

As illustrated in FIG. 1, the expansion-molded article 1 is formed of a polypropylene resin composition 2 including 100 weight of a polypropylene resin and 1 to 4 parts by weight of a polyethylene wax having a viscosity average molecular weight of 2400 to 3400 and has an expansion rate of 2 to 3 times; the thickness of the skin layer 11 is not less than 0.2 mm and not more than 0.4 mm; and the total volume occupied by a cavity part of expansion cells 13, which respectively have an opening area of the maximum cross section of not more than 0.1 mm$^2$, included in unit volume of a part 12 other than the skin layer 11 is not less than 60%.

Figure 2:
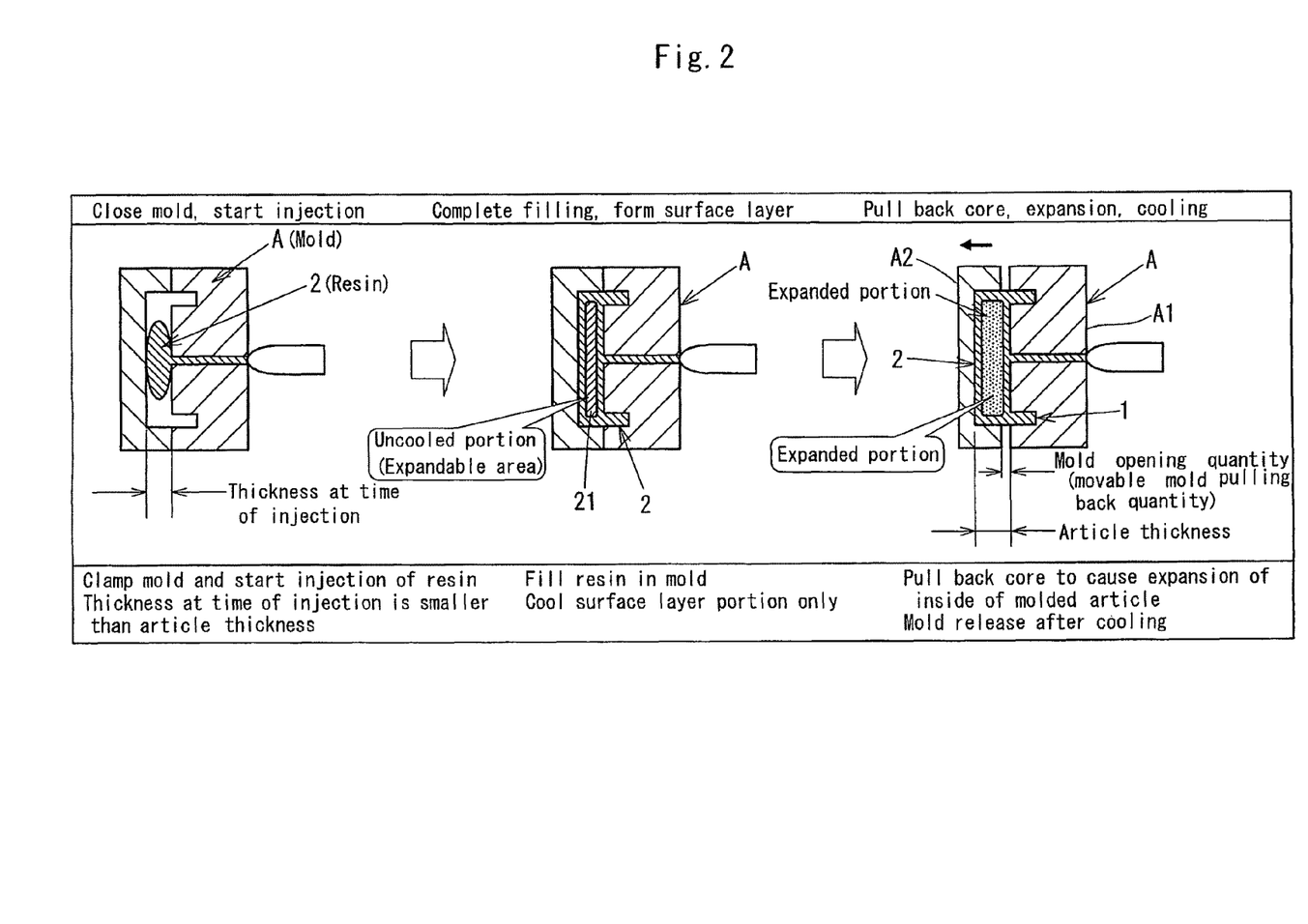
FIG. 2 A view for illustrating a process for producing an expansion-molded article in FIG. 1 in order of steps.

In addition, the expansion-molded article 1 is obtained, as illustrated in FIG. 2, by: filling the polypropylene resin composition 2 in a cavity of a closed mold A; then cooling the resin composition with an uncooled portion (expandable part) 21 being left in a central portion in the thickness direction; pulling back the core of a movable mold A2 to cause expansion of the uncooled portion (expandable part) 21; and then cooling and solidifying the resin composition.

Next, an example of a process for producing the expansion-molded article 1 using the mold A illustrated in FIGS. 3 to 5 will be explained in detail.

Figure 3:
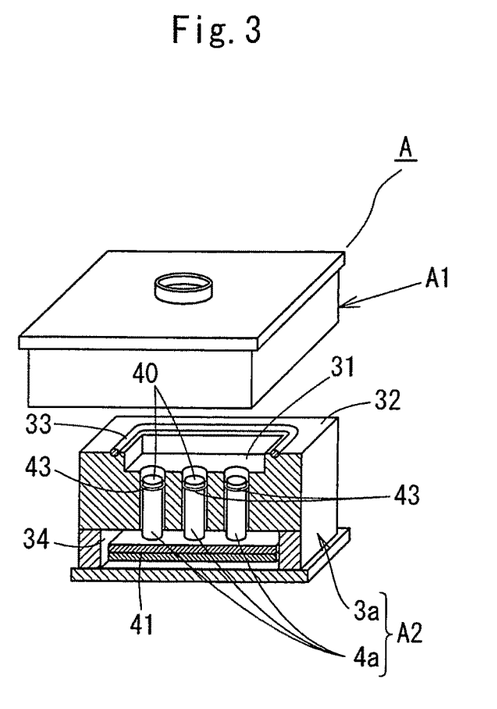
FIG. 3 A partially broken perspective sectional view of one example of a mold to be used in the present invention.

That is, the mold A comprises a stationary mold A1 and the movable mold A2 as illustrated in FIGS. 3 to 5.

The stationary mold A1 comprises a sprue 10 as illustrated in FIGS. 4 and 5, and the movable mold A2 comprises a movable mold body 3a and three slide molds 4a.

Figure 4A:
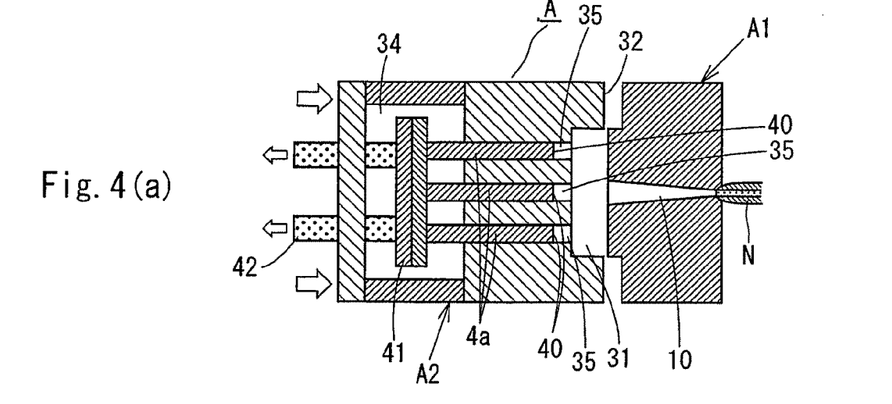
FIG. 4 Sectional views for explaining a process for producing an expansion-molded article using a mold for injection molding in FIG. 3 in order of operations of the mold.
Figure 4B:
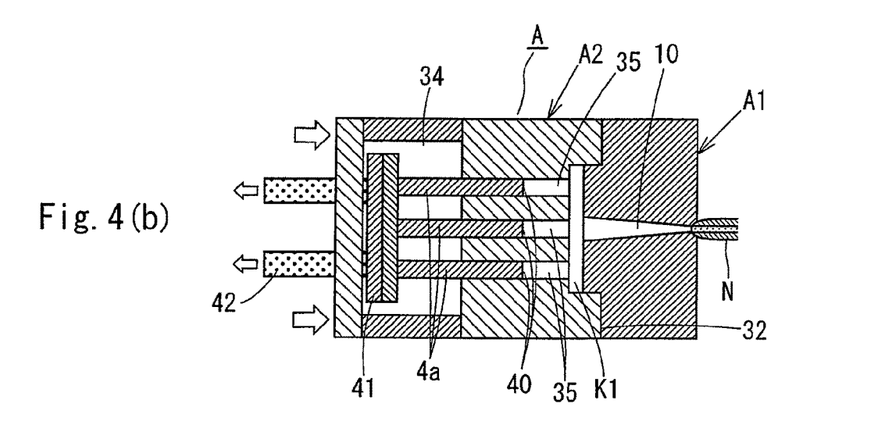
Figure 4C:
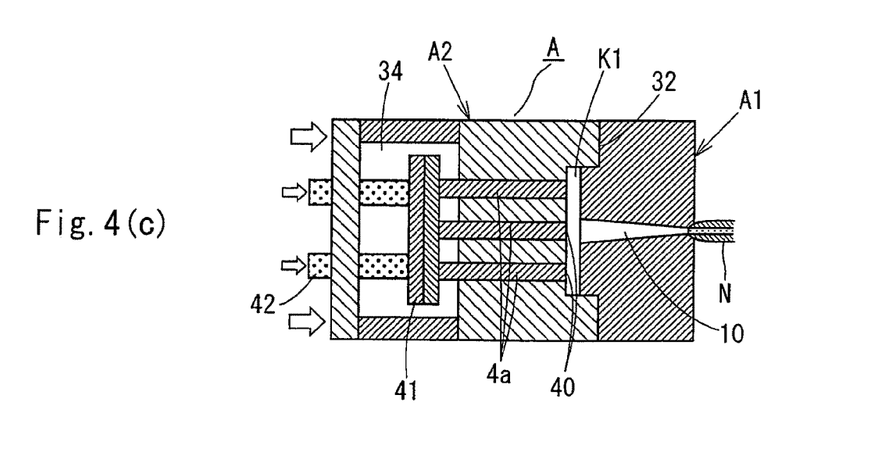
Figure 5A:
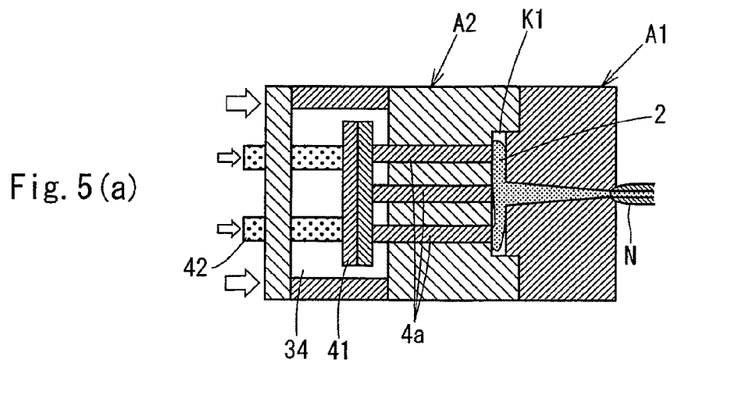
FIG. 5 Sectional views for explaining operations of a mold in steps after FIG. 4 in order thereof.

The movable mold body 3a is provided with a concave portion 31, which forms a cavity K1 illustrated in FIGS. 4(b), 4(c) and 5(a) when closed against the stationary mold A1, and an O-ring 33 made of silicone resin is attached to a parting face 32 around the concave portion 31 as illustrated in FIG. 3.

Moreover, the movable mold body 3a is provided with an operation plate holder 34 for holding a slide mold operation plate 41, which will be described later, so as to be able to slide to and from the concave portion 31, and three slide mold through-holes (which will be hereinafter referred to simply as "through-holes") 35 are formed in parallel from the operation plate holder 34 toward the concave portion 31.

The slide mold operation plate 41 can be moved to and from the concave portion 31 by hydraulic cylinders 42, and one end of each of the three slide molds 4a is fixed at the slide mold operation plate 41.

Each slide mold 4a has a circular cylindrical shape provided with a cavity formation face 40 at one end, and is inserted into a slide mold through-hole 35 so as to be able to slide in the axial direction of the through-hole 35. An O-ring 43 for ensuring airtightness of the inside of the cavity K1 is fitted on the outer surface of each slide mold 4a to be sandwiched between a slide mold 4a and a slide mold through-hole 35.

Moreover, the mold A is provided with an exhaust pipe valve for reducing the air pressure of the inside of the cavity K1 respectively at a mold site facing a part adjacent to a weld at the rear face side of a molded article and at a melt resin flow end portion, although not illustrated.

It is to be noted that N in the FIGS. 4 and 5 is a nozzle of an injection device.

The mold A has a structure described above, and an expansion-molded article can be formed as follows.

(1) Operate the hydraulic cylinders 42 to move the slide molds 4a so that the cavity formation faces 40 thereof are positioned behind a cavity wall as illustrated in FIG. 4(a), move the movable mold A2 to the side of the stationary mold A1, and close the mold as illustrated in FIG. 4(b).

(2) Operate the hydraulic cylinders 42 to move the slide molds 4a toward the stationary mold A1 so that the cavity formation faces 40 come to a cavity wall as illustrated in FIG. 4(c). That is, the movement of the slide molds 4a keeps the air pressure of the inside of the cavity K1 increased to a predetermined pressure of (atmospheric pressure+0.05) MPa to (atmospheric pressure+1) MPa (0.05 MPa to 1 MPa by gauge pressure of a pressure indicator, the following being described by gauge pressure).

(3) Fill the polypropylene resin composition 2 in the cavity K1, which is pressurized to a predetermined pressure of 0.05 to 1 MP by gauge pressure as described above, by injection within 1.5 seconds as illustrated in FIG. 5(a). Then open and close exhaust pipe valves, which are formed respectively at a mold site facing a portion adjacent to a weld at the rear face side of a molded article and at a melt resin flow end portion, in time by control of a mold closing start signal immediately before completion of filling, to exhaust air from the cavity K1 so that the air pressure of the inside of the cavity is reduced roughly to the atmospheric pressure.

Figure 5B:
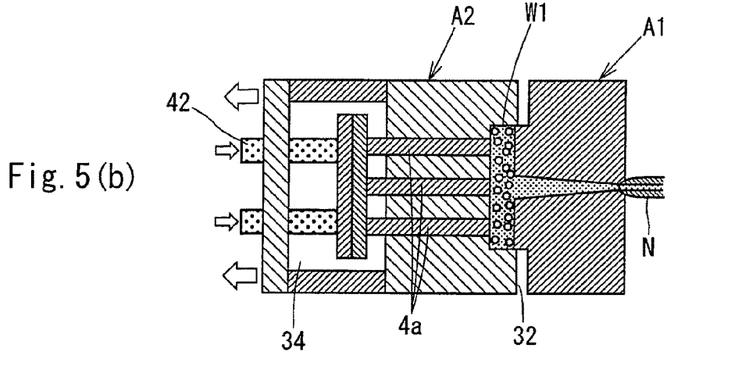

(4) Move the movable mold A2 slightly in a mold opening direction 0.2 to 2 seconds after completion of injection filling as illustrated in FIG. 5(b), that is, pull back the core to expand the cavity capacity so as to cause expansion of the polypropylene resin composition 2.

Figure 5C:
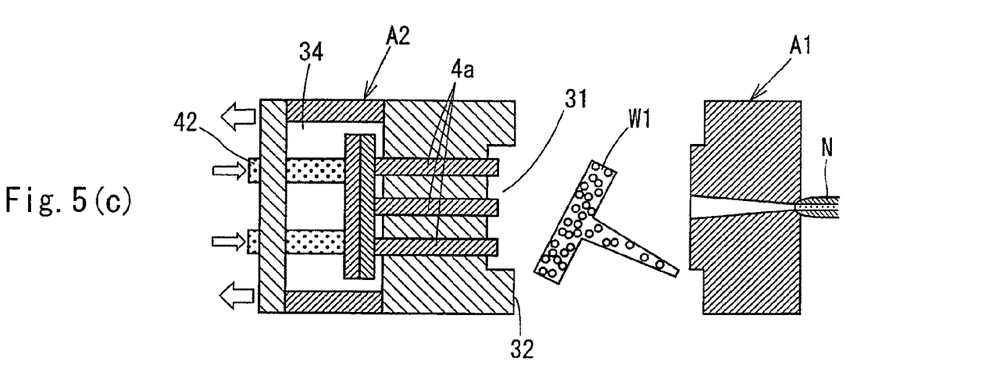

(5) Cool and solidify the polypropylene resin composition 2, then open the mold completely as illustrated in FIG. 5(c) and operate the hydraulic cylinders 42 to eject an end of the slide molds 4a into the concave portion 31, so that an expansion-molded article W1 is pushed out.

The following description will explain the present invention in detail with reference to specific examples and comparison examples.

EXAMPLE 1

An automotive rear door trim as an expansion-molded article was produced by injection expansion molding for a resin composition, which was obtained by adding 5 parts by weight (quantity corresponding to a theoretical expansion rate of 3.3 times) of an expanding agent (trade name of EE25C produced by Eiwa Chemical Ind. Co., Ltd.) including sodium hydrogen carbonate and 1 part by weight of a polyethylene wax (trade name of EXCEREX 30200B produced by Mitsui Chemicals, Inc., having a viscosity average molecular weight of 2900) to 100 parts by weight of a polypropylene (trade name of J830HV produced by Prime Polymer Co., Ltd.), using an injection molding device (trade name of MD850S-III produced by Ube Machinery Corporation, Ltd.) on the following condition.

Thickness of a cavity at the time of injection filling of resin: 1.45 mm

Mold opening width at the time of core pulling back: 1.55 mm

Waiting time for opening of a mold before start of core pulling back: 0.5 seconds Thickness of a molded article: 3 mm (expansion rate of 2.07 times)

Mold Temperature: 50° C.

Temperature of injected resin: 200° C.

When a molded article which had been obtained was cut and the cross section thereof was observed, cross section of each of the cells had a circular shape or an oval shape as illustrated in FIG. 1 and the average of the diameter thereof was 0.3 mm.

EXAMPLE 2

An automotive rear door trim as an expansion-molded article was produced by injection expansion molding in a manner similar to that of Example 1, except that 4 parts by weight of a polyethylene wax (trade name of EXCEREX 30200B produced by Mitsui Chemicals, Inc., having a viscosity average molecular weight of 2900) was used.

When a molded article which had been obtained was cut and the cross section thereof was observed, cross section of each of the cells had a circular shape or an oval shape as illustrated in FIG. 1 and the average of the diameter thereof was 0.25 mm.

COMPARISON EXAMPLE 1

An automotive rear door trim as an expansion-molded article was produced by injection expansion molding in a manner similar to that of Example 1, except that 0 parts by weight of a polyethylene wax (trade name of EXCEREX 30200B produced by Mitsui Chemicals, Inc., having a viscosity average molecular weight of 2900) was used.

Figure 6:
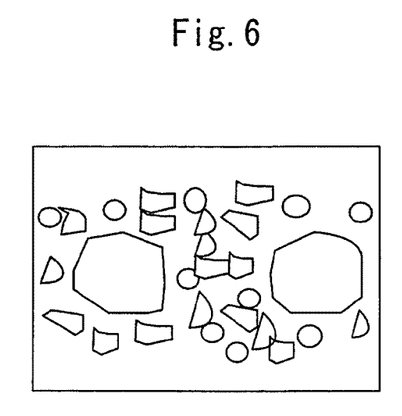
FIG. 6 A replica view of a cross-sectional shape of an expansion-molded article obtained in Comparison Example 1.

When a molded article which had been obtained was cut and the cross section thereof was observed, a large number of large cells having a cross-section diameter of approximately 0.3 mm were found adjacent to the surface layer and cells having a cross-section diameter of not less than 2 mm were formed in a central part as illustrated in FIG. 6, causing cavitation.

COMPARISON EXAMPLE 2

An automotive rear door trim as an expansion-molded article was produced by injection expansion molding in a manner similar to that of Example 1, except that 0.8 parts by weight of a polyethylene wax (trade name of EXCEREX 30200B produced by Mitsui Chemicals, Inc., having a viscosity average molecular weight of 2900) was used.

Figure 7:
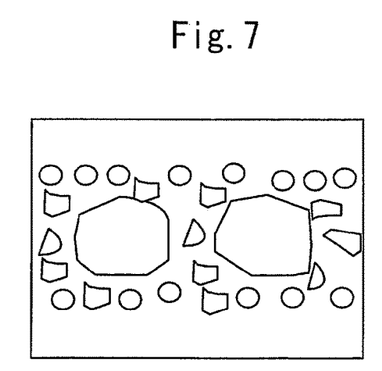
FIG. 7 A replica view of a cross-sectional shape of an expansion-molded article obtained in Comparison Example 2.

When a molded article which had been obtained was cut and the cross section thereof was observed, a large number of large cells having a cross-section diameter of approximately 0.3 mm were found adjacent to the surface layer and cells having a cross-section diameter of approximately 2 mm were formed in a central part as illustrated in FIG. 7, causing cavitation.

COMPARISON EXAMPLE 3

An automotive rear door trim as an expansion-molded article was produced by injection expansion molding in a manner similar to that of Example 1, except that 4.5 parts by weight of a polyethylene wax (trade name of EXCEREX 30200B produced by Mitsui Chemicals, Inc., having a viscosity average molecular weight of 2900) was used.

Figure 8:
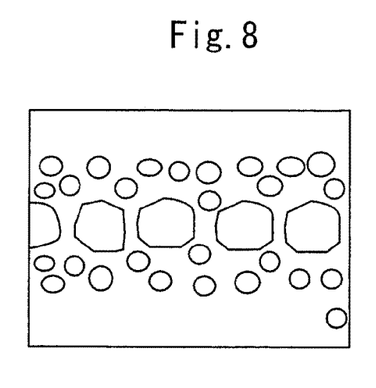
FIG. 8 A replica view of a cross-sectional shape of an expansion-molded article obtained in Comparison Example 3.

When a molded article which had been obtained was cut and the cross section thereof was observed, the number of cells was small as illustrated in FIG. 8, the cross section was large so that the average of the diameter was not less than 0.5 mm, causing a coarse expansion state.

COMPARISON EXAMPLE 4

An automotive rear door trim as an expansion-molded article was produced by injection expansion molding in a manner similar to that of Example 1, except that a resin composition, which was obtained by adding 5 parts by weight of an expanding agent (trade name of EE25C produced by Eiwa Chemical Ind. Co., Ltd.) and 1 part by weight of a polyethylene wax (trade name of EXCEREX 48070B produced by Mitsui Chemicals, Inc., having a viscosity average molecular weight of 4600) to 100 parts by weight of a polypropylene (trade name of J830HV produced by Prime Polymer Co., Ltd.), was used.

Figure 9:
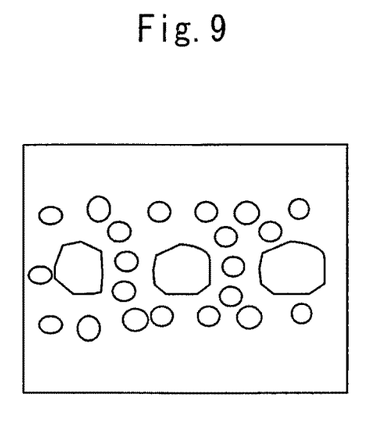
FIG. 9 A replica view of a cross-sectional shape of an expansion-molded article obtained in Comparison Example 4.

When a molded article which had been obtained was cut and the cross section thereof was observed, a large number of large cells having a cross-section diameter of approximately 0.3 mm were found adjacent to the surface layer as illustrated in FIG. 9 and cells having a cross-section diameter of approximately 2 mm were formed in a central portion, causing cavitation.

EXAMPLE 3

An automotive back door trim as an expansion-molded article was produced by injection expansion molding for a resin composition, which was obtained by adding 4 parts by weight (quantity corresponding to a theoretical expansion rate of 3.2 times) of an expanding agent (trade name of MB3064 produced by Sankyo Kasei Ind. Co., Ltd.) including sodium hydrogen carbonate and 1 part by weight of a polyethylene wax (trade name of EXCEREX 30200B produced by Mitsui Chemicals, Inc., having a viscosity average molecular weight of 2900) to 100 parts by weight of a polypropylene (trade name of BC3LS produced by Japan Polypropylene Corporation), using an injection molding device (trade name of MD850S-III produced by Ube Machinery Corporation, Ltd.) on the following condition.

Thickness of a cavity at the time of injection filling of resin: 1.7 mm

Mold opening width at the time of core pulling back: 1.8 mm

Waiting time for opening of a mold before start of core pulling back: 2 seconds

Thickness of a molded article: 3.5 mm (expansion rate of 2.06 times)

Mold Temperature: 60° C.

Temperature of injected resin: 210° C.

When a molded article which had been obtained was cut and the cross section thereof was observed, cross section of each of the cells had a circular shape or an oval shape as illustrated in FIG. 1 and the average of the diameter thereof was 0.23 mm.

EXAMPLE 4

An automotive back door trim as an expansion-molded article was produced by injection expansion molding in a manner similar to that of Example 3, except that 4 parts by weight of a polyethylene wax (trade name of EXCEREX 30200B produced by Mitsui Chemicals, Inc., having a viscosity average molecular weight of 2900) was used.

When a molded article which had been obtained was cut and the cross section thereof was observed, cross section of each of the cells had a circular shape or an oval shape as illustrated in FIG. 1 and the average of the diameter thereof was 0.22 mm.

EXAMPLE 5

An automotive back door trim as an expansion-molded article was produced by injection expansion molding in a manner similar to that of Example 4, except that the mold opening width at the time of core pulling back was 3.3 mm, the thickness of a molded article was 5.0 mm (expansion rate of 2.94 times) and the waiting time for opening of a mold was 1 second.

When a molded article which had been obtained was cut and the cross section thereof was observed, cross section of each of the cells had a circular shape or an oval shape as illustrated in FIG. 1 and the average of the diameter thereof was 0.29 mm.

COMPARISON EXAMPLE 5

An automotive back door trim as an expansion-molded article was produced by injection expansion molding in a manner similar to that of Example 3, except that 0 parts by weight of a polyethylene wax (trade name of EXCEREX 30200B produced by Mitsui Chemicals, Inc., having a viscosity average molecular weight of 2900) was used, the mold opening width at the time of core pulling back was 0.6 mm, and the thickness of a molded article was 2.3 mm (expansion rate of 1.35 times).

When a molded article which had been obtained was cut and the cross section thereof was observed, cross section of each of the cells had a circular shape or an oval shape as illustrated in FIG. 1 and the average of the diameter thereof was 0.4 mm.

COMPARISON EXAMPLE 6

An automotive back door trim as an expansion-molded article was produced by injection expansion molding in a manner similar to that of Comparison Example 5, except that the temperature of injected resin was 190° C., the mold opening width at the time of core pulling back was 0.8 mm, and the thickness of a molded article was 2.5 mm (expansion rate of 1.47 times).

When a molded article which had been obtained was cut and the cross section thereof was observed, cross section of each of the cells had a circular shape or an oval shape, the average of the diameter thereof was 0.5 mm, and the number of cells was small.

COMPARISON EXAMPLE 7

An automotive back door trim as an expansion-molded article was produced by injection expansion molding in a manner similar to that of Comparison Example 6, except that the mold temperature was 50° C., the mold opening width at the time of core pulling back was 0.7 mm, and the thickness of a molded article was 2.4 mm (expansion rate of 1.41 times).

When a molded article which had been obtained was cut and the cross section thereof was observed, cross section of each of the cells had a circular shape or an oval shape, the average of the diameter thereof was 0.5 mm, and the number of cells was small.

COMPARISON EXAMPLE 8

An automotive back door trim as an expansion-molded article was produced by injection expansion molding in a manner similar to that of Comparison Example 6, except that 6 parts by weight (quantity corresponding to a theoretical expansion rate of 4.8 times) of an expanding agent (MB3064 produced by Sankyo Kasei Ind. Co., Ltd.) was used, the mold opening width at the time of core pulling back was 1.0 mm, and the thickness of a molded article was 2.7 mm (expansion rate of 1.59 times).

When a molded article which had been obtained was cut and the cross section thereof was observed, cross section of each of the cells had a circular shape or an oval shape, the average of the diameter thereof was 0.35 mm, and the number of cells was small.

COMPARISON EXAMPLE 9

An automotive back door trim as an expansion-molded article was produced by injection expansion molding in a manner similar to that of Example 5, except that 0.8 parts by weight of a polyethylene wax (trade name of EXCERX 30200B produced by Mitsui Chemicals, Inc., having a viscosity average molecular weight of 2900) was used, the resin temperature was 190° C., the mold opening width at the time of core pulling back was 1.3 mm, and the thickness of a molded article was 3.0 mm (expansion rate of 1.76 times).

When a molded article which had been obtained was cut and the cross section thereof was observed, cross section of each of the cells had a circular shape or an oval shape, the average of the diameter thereof was 0.35 mm, and the number of cells was small.

COMPARISON EXAMPLE 10

An automotive back door trim as an expansion-molded article was produced by injection expansion molding in a manner similar to that of Example 5, except that 4.3 parts by weight of a polyethylene wax (trade name of EXCERX 30200B produced by Mitsui Chemicals, Inc., having a viscosity average molecular weight of 2900) was used, the resin temperature was 190° C., the mold opening width at the time of core pulling back was 1.4 mm, and the thickness of a molded article was 3.1 mm (expansion rate of 1.82 times).

When a molded article which had been obtained was cut and the cross section thereof was observed, cross section of each of the cells had a circular shape or an oval shape, the average of the diameter thereof was 0.35 mm, and the number of cells was small.

COMPARISON EXAMPLE 11

An automotive back door trim as an expansion-molded article was produced by injection expansion molding in a manner similar to that of Example 1, except that the mold opening width at the time of core pulling back was 3.4 mm, and the thickness of a molded article was 5.3 mm (expansion rate of 3.11 times).

Figure 10:
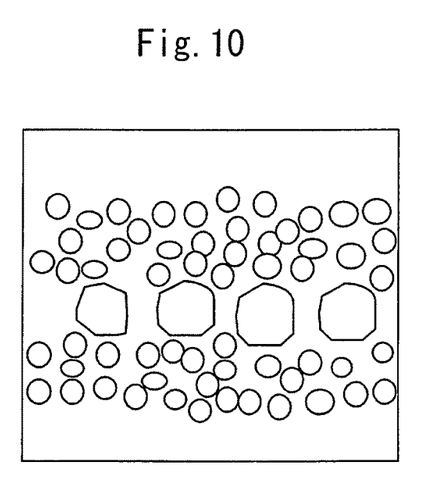
FIG. 10 A replica view of a cross-sectional shape of an expansion-molded article obtained in Comparison Example 11.

When a molded article which had been obtained was cut and the cross section thereof was observed, small cells, which had a cross section in a circular shape or an oval shape and the average of the diameter of which was 0.29 mm, and a large cavity part, which was made by burst foam and is referred to as a void, were found as illustrated in FIG. 10.

The appearance quality, the flexural strength, the low-temperature impact strength, the thickness of the skin layer and the total volume of a cavity portion of expansion cells, the maximum cross section of which was not more than 0.1 mm$^2$, in an arbitrary 1 mm$^3$ of a part excluding the skin layer of expansion-molded articles obtained by the Examples 1 to 5 and the Comparison Examples 1 to 11 described above were examined, and the result thereof is shown in Table 1.

It is to be noted that the total volume of a cavity portion of expansion cells was obtained by: cutting out a provided volume from an expansion site of an molded article which had been obtained; and measuring the density thereof. (Average of n=10).

The flexural strength was measured with reference to a method of JIS K 7203 after cutting out a length of 80 mm and a width of 10 mm (the thickness is the same as the thickness of the molded article) from the expansion-molded article.

The low-temperature impact strength was measured in a thermostatic chamber at −30° C. after attaching the expansion-molded article to a receiver jig. An iron ball of 500 g was first dropped from a height of 10 cm, and the height was increased by 5 cm when breakage did not arise, so as to find the height where breakage arises. Drop-weight height was obtained by subtracting 5 cm from the height where breakage arose. (Height where breakage does not arise)

TABLE 1

| | Appearance Quality Irregularity, Waviness, Deformation | Flexural Strength (MPa) | Low-Temperature Impact Strength Drop-Weight Height (cm) | Total Volume Ratio of Expansion Cell Cavity Portion (%) |
| --- | --- | --- | --- | --- |
| Example 1 | Good Surface | 630 | 70 | 60% |
| Example 2 | Good Surface | 620 | 75 | 70% |
| Comparison Example 1 | Irregular Surface, Waviness | 400 | 15 | 15% |
| Comparison Example 2 | Irregular Surface, Waviness | 450 | 35 | 35% |
| Comparison Example 3 | Irregular Surface, Waviness | 420 | 60 | 40% |
| Comparison Example 4 | Irregular Surface, Waviness | 550 | 40 | 40% |
| Example 3 | Good Surface | 960 | 80 | 65% |
| Example 4 | Good Surface | 990 | 85 | 68% |
| Example 5 | Good Surface | 490 | 65 | 75% |
| Comparison Example 5 | Good Surface | 950 | 35 | 20% |
| Comparison Example 6 | Good Surface | 900 | 25 | 25% |
| Comparison Example 7 | Good Surface | 380 | 30 | 28% |
| Comparison Example 8 | Good Surface | 400 | 40 | 35% |
| Comparison Example 9 | Good Surface | 700 | 45 | 45% |
| Comparison Example 10 | Good Surface | 600 | 45 | 52% |
| Comparison Example 11 | Good Surface | 400 | 35 | 55% |

The above Table 1 shows that an expansion-molded article of the present invention using a polypropylene resin composition of the present invention has an excellent appearance configuration, is light in weight, and has excellent strength.

EXAMPLE 6

An automotive rear door trim as an expansion-molded article was produced by injection expansion molding in a manner similar to that of Example 1, except that 4 parts by weight of a polyethylene wax (obtained by mixing trade name of Hi-WAX 320P produced by Mitsui Chemicals, Inc. and trade name of Hi-WAX 420P produced by Mitsui Chemicals, Inc. in a ratio by weight of 60:40) having a viscosity average molecular weight of 3400 was used. When an expansion-molded article which had been obtained was cut and the cross section thereof was observed, cross section of each of the cells had a circular shape or an oval shape as illustrated in FIG. 1 and the average of the diameter of the cells was 0.28 mm. Moreover, the thickness of the skin layer was 0.3 mm.

EXAMPLE 7

An automotive rear door trim as an expansion-molded article was produced by injection expansion molding in a manner similar to that of Example 1, except that 4 parts by weight of a polyethylene wax (obtained by mixing trade name of Hi-WAX 210P produced by Mitsui Chemicals, Inc. and trade name of Hi-WAX 420P produced by Mitsui Chemicals, Inc. in a ratio by weight of 50:50) having a viscosity average molecular weight of 2500 was used. When an expansion-molded article which had been obtained was cut and the cross section thereof was observed, cross section of each of the cells had a circular shape or an oval shape as illustrated in FIG. 1 and the average of the diameter of the cells was 0.33 mm. Moreover, the thickness of the skin layer was 0.3 mm.

EXAMPLE 8

An automotive rear door trim as an expansion-molded article was produced by injection expansion molding in a manner similar to that of Example 1, except that the mold opening width at the time of core pulling back was 1 mm (expansion rate of 1.69 times). When a molded article which had been obtained was cut and the cross section thereof was observed, cross section of the cells had a circular shape or an oval shape as illustrated in FIG. 1 and the average of the diameter thereof was 0.2 mm. Moreover, the thickness of the skin layer was 0.3 mm.

COMPARISON EXAMPLE 12

An automotive rear door trim as an expansion-molded article was produced by injection expansion molding in a manner similar to that of Example 8, except that a polyethylene wax was not mixed.

When a molded article which had been obtained was cut and the cross section thereof was observed, the total number of cells is small as shown in FIG. 6, cells having a cross-section diameter of approximately 0.3 mm were found adjacent to the surface, and cells having a cross-section diameter of approximately 2 mm were formed in a central part, causing cavitation. Moreover, the thickness of the skin layer was 0.3 mm.

The appearance quality, the flexural strength, the low-temperature impact strength, the thickness of the skin layer and the total volume of a cavity portion of expansion cells, the maximum cross section of which was not more than 0.1 mm$^2$, in an arbitrary 1 mm$^3$ of a part excluding the skin layer of expansion-molded articles obtained by the Examples 6 to 8 and the Comparison Example 12 described above were examined in a manner similar to that described above, and the result thereof is shown in Table 2.

TABLE 2

| | Appearance Quality Irregularity, Waviness, Deformation | Flexural Strength (MPa) | Low-Temperature Impact Strength Drop-weight Height (cm) | Total Volume Ratio of Expansion Cell Cavity Portion (%) |
| --- | --- | --- | --- | --- |
| Example 6 | Good Surface | 620 | 70 | 60% |
| Example 7 | Good Surface | 610 | 70 | 60% |
| Example 8 | Good Surface | 800 | 80 | 50% |

TABLE 2-continued

|  | Appearance Quality Irregularity, Waviness, Deformation | Flexural Strength (MPa) | Low-Temperature Impact Strength Drop-weight Height (cm) | Total Volume Ratio of Expansion Cell Cavity Portion (%) |
|---|---|---|---|---|
| Comparison Example 12 | Irregular Surface | 600 | 50 | 45% |

EXAMPLE 9

Using a mold comprising a slide mold mechanism similar to the mold A, which is shown in FIG. 3 and has a box shape length of 300 mm, width of 200 mm, height of 5 mm and thickness of 1.5 mm and a cavity capacity of 95.2 cm³ (in a state before expansion), the air pressure of the inside of the cavity was kept to the atmospheric pressure (0 MPa by gage pressure) after closing a mold, a polypropylene resin composition similar to that of Example 1 was filled in the mold by injection within 1.5 seconds, the core of the movable mold was pulled back 0.5 seconds after completion of injection filling so that the expansion rate becomes 2.0 times, an expansion process was performed, and a cooling process was performed, so that an expansion-molded article was obtained.

EXAMPLE 10

Using a mold comprising a slide mold mechanism similar to the mold A, which is shown in FIG. 3 and has a box shape length of 300 mm, width of 200 mm, height of 5 mm and thickness of 1.5 mm and a cavity capacity of 95.2 cm³ (in a state before expansion), the air pressure of the inside of the cavity was adjusted to 0.03 MPa by gauge pressure after closing a mold, then a polypropylene resin composition similar to that of Example 1 was filled in the mold by injection within 1.5 seconds, and air was exhausted from the cavity through the parting face 0.4 seconds after completion of filling of resin.

Then, the core of the movable mold was pulled back 0.5 seconds after completion of filling of resin so that the expansion rate becomes 2.0 times, an expansion process was performed, and a cooling process was performed, so that an expansion-molded article was obtained.

EXAMPLE 11

An expansion-molded article was obtained in a manner similar to that of Example 10 except that the air pressure of the inside of the cavity was adjusted to 0.03 MPa by gauge pressure after closing a mold.

EXAMPLE 12

An expansion-molded article was obtained in a manner similar to that of Example 10 except that the air pressure of the inside of the cavity was adjusted to 0.4 MPa by gauge pressure after closing a mold.

EXAMPLE 13

An expansion-molded article was obtained in a manner similar to that of Example 12 except that the core of the movable mold was pulled back 1.0 seconds after completion of filling of resin.

EXAMPLE 14

Using a mold comprising a slide mold mechanism similar to the mold A, which is shown in FIG. 3 and has a box shape length of 300 mm, width of 200 mm, height of 5 mm and thickness of 1.5 mm and a cavity capacity of 95.2 cm³ (in a state before expansion), the air pressure of the inside of the cavity was adjusted to 0.4 MPa by gauge pressure after closing a mold, then a polypropylene resin composition similar to that of Example 1 was filled in the mold by injection within 1.5 seconds, and air was exhausted from the cavity through the parting face, a part adjacent to a weld and a flow end 0.4 seconds after completion of filling of resin.

Then, the core of the movable mold was pulled back 1.5 seconds after completion of filling of resin so that the expansion rate becomes 2.0 times, an expansion process was performed, and a cooling process was performed, so that an expansion-molded article was obtained.

EXAMPLE 15

An expansion-molded article was obtained in a manner similar to that of Example 14 except that the air pressure of the inside of the cavity was adjusted to 0.08 MPa by gauge pressure after closing a mold and the core of the movable mold was pulled back 0.5 seconds after completion of filling of resin.

EXAMPLE 16

An expansion-molded article was obtained in a manner similar to that of Example 14 except that the air pressure of the inside of the cavity was adjusted to 0.4 MPa by gauge pressure after closing a mold and the core of the movable mold was pulled back 3.0 seconds after completion of filling of resin.

EXAMPLE 17

An expansion-molded article was obtained in a manner similar to that of Example 16 except that air was exhausted from the cavity and the core of the movable mold was pulled back, concurrently with completion of filling of resin.

The maximum molding sink quantity, existence or nonexistence of burst foam at the surface, the thickness of the skin layer and the glossiness of expansion-molded articles obtained by the Examples 9 to 17 described above were examined, and the result thereof is shown in Tables 3 and 4 together with the internal pressure (gauge pressure) of the cavity before start of injection filling.

The maximum molding sink quantity was obtained by measuring the depth of the deepest portion of a recess from a flat portion of the surface of an expansion-molded article, using a depth gauge.

The thickness of the skin layer was obtained by measuring the thickness from the surface skin side of the skin layer to a position at the expansion layer side where foam can be confirmed, using a digital microscope (laser microscope may also be used).

The glossiness was obtained by shedding light having an incident angle of 60° C. on the surface of an expansion-molded article and measuring the quantity of reflected light, using a gloss meter, according to a glossiness measuring method of JIS-Z-8741-1959.

TABLE 3

| | | Examples | | | | |
|---|---|---|---|---|---|---|
| | | 9 | 10 | 11 | 12 | 13 |
| Gauge Pressure (MPa) | | 0 | 0.03 | 0.05 | 0.4 | 0.4 |
| Appearance | Maximum Molding Sink Quantity (mm) | 0.5 | 0.15 | 0.05 | 0.03 | 0.03 |
| | Existence or Nonexistence of Burst Foam | Exist | Slightly Exist | Not Exist | Not Exist | Not Exist |
| | Glossiness (%) | 10 | 40 | 80 | 90 | 90 |
| Thickness of Skin Layer (mm) | | 0.31 | 0.33 | 0.31 | 0.31 | 0.34 |

TABLE 4

| | | Examples | | | |
|---|---|---|---|---|---|
| | | 14 | 15 | 16 | 17 |
| Gauge Pressure (MPa) | | 1.0 | 0.08 | 0.4 | 0.4 |
| Appearance | Maximum Molding Sink Quantity (mm) | 0.02 | 0.01 | 0.03 | 0.10 |
| | Existence or Nonexistence of Burst Foam | Not Exist | Not Exist | Not Exist | Slightly Exist |
| | Glossiness (%) | 90 | 90 | 90 | 60 |
| Thickness of Skin Layer (mm) | | 0.37 | 0.32 | 0.55 | 0.15 |

The invention claimed is:

1. An expansion-molded article comprising a polypropylene resin composition comprising a polyproylene resin which is an ethylene propylene copolymer; a polyethylene wax having a viscosity average molecular weight of 2400 to 3400 wherein the polyethylene wax is an ethylene butene copolymer or an ethylene propylene copolymer; and a chemical expanding agent wherein the expanding agent is a low density polyethylene with sodium hydrogen carbonate, wherein a compounding ratio of the polyethylene wax is 1 to 4 parts by weight relative to 100 parts by weight of the polypropylene resin, characterized in that the polypropylene resin composition has an expansion rate of 1.5 to 3 times; and wherein the total capacity occupied by a cavity part of expansion cells, which respectively have an opening area of a maximum cross section of not more than 0.1 mm$^2$, included in an unit volume of a part other than a skin layer of the expansion-molded article is between 60% to 75%.

2. The expansion-molded article according to claim 1, characterized in that the thickness of a skin layer of the expansion-molded article is 0.2 to 0.4 mm.

3. A process for producing the expansion-molded article according to claim 2, comprising: a step of filling the polypropylene resin composition for injection expansion molding in a cavity, which is formed of a stationary mold and a movable mold, by injection with the inside of a cavity being pressurized from atmospheric pressure+0.05 MPa to atmospheric pressure+1 MPa; a step of releasing a pressurized state of the inside of the cavity; and a step of pulling back a core of the movable mold.

4. A process for producing the expansion-molded article according to claim 1, comprising: a step of filling the polypropylene resin composition for injection expansion molding in a cavity, which is formed of a stationary mold and a movable mold, by injection with the inside of a cavity being pressurized from atmospheric pressure+0.05 MPa to atmospheric pressure+1 MPa; a step of releasing a pressurized state of the inside of the cavity; and a step of pulling back a core of the movable mold.

5. The process for producing the expansion-molded article according to claim 4, wherein the core of the movable mold is pulled back 0.2 to 2 seconds after completion of injection filling of the polypropylene resin composition for injection expansion molding into the cavity.

6. The process for producing the expansion-molded article according to claim 5, wherein pressure of the inside of the mold is released from at least one site selected from: a mold site facing a part adjacent to a weld at a rear face side of a molded article; a flow end of a polypropylene resin composition for injection expansion molding; a mold parting part; and a mold site facing a molding flash part provided adjacent to the parting.

7. The process for producing the expansion-molded article according to claim 5, wherein injection filling of the polypropylene resin composition for injection expansion molding into the cavity is completed within 1.5 seconds.

8. The process for producing the expansion-molded article according to claim 4, wherein pressure of the inside of the mold is released from at least one site selected from: a mold site facing a part adjacent to a weld at a rear face side of a molded article; a flow end of a polypropylene resin composition for injection expansion molding; a mold parting part; and a mold site facing a molding flash part provided adjacent to the parting.

9. The process for producing the expansion-molded article according to claim 8, wherein injection filling of the polypropylene resin composition for injection expansion molding into the cavity is completed within 1.5 seconds.

10. The process for producing the expansion-molded article according to claim 4, wherein injection filling of the polypropylene resin composition for injection expansion molding into the cavity is completed within 1.5 seconds.

* * * * *